United States Patent [19]

Straut

[11] 4,083,436

[45] Apr. 11, 1978

[54] BRAKE APPARATUS INCLUDING LOCKING MEANS THEREFOR

[75] Inventor: John E. Straut, Mahwah, N.J.

[73] Assignee: Abex Corporation, New York, N.Y.

[21] Appl. No.: 675,820

[22] Filed: Apr. 12, 1976

[51] Int. Cl.² ............................................. B60R 25/08
[52] U.S. Cl. ........................................ 188/265; 60/477;
 92/17; 92/84; 188/217; 192/114 R; 417/259
[58] Field of Search ................. 188/265, 217; 303/89;
 192/70.22, 114; 92/17, 84; 60/477, 479, 481;
 254/89 H, 93 H; 417/259

[56] References Cited

U.S. PATENT DOCUMENTS

| 2,643,642 | 6/1953 | Geyer ........................................ 92/17 |
| 2,701,035 | 2/1955 | Leichsenring ................... 188/265 X |
| 2,730,994 | 1/1956 | Light ........................................ 92/17 X |
| 3,550,731 | 12/1970 | Roselius et al. ..................... 303/89 X |
| 3,684,063 | 8/1972 | Crabtree ............................... 188/265 |
| 3,983,975 | 10/1976 | Wright ................................. 303/89 X |

FOREIGN PATENT DOCUMENTS

| 279,681 | 11/1930 | Italy ..................................... 417/259 |
| 1,352,133 | 5/1974 | United Kingdom ................... 60/477 |

*Primary Examiner*—George E. A. Halvosa
*Attorney, Agent, or Firm*—Kinzer, Plyer, Dorn & McEachran

[57] ABSTRACT

Brake apparatus, particularly one in which the brake may be both actuated and released by a hydraulic force, held engaged by a mechanical force and in which a strong spring force, tending to restore the brake, prevails while the brake is held engaged; brake applying pressure, after the brake is engaged, is at first slowly released, hydraulic pressure employed to release the brake is maintained at a minimum value even though the brake may be released and certain conditions are sensed for coincidence before generating a signal indicating that the brake release conditions are complied with.

4 Claims, 20 Drawing Figures

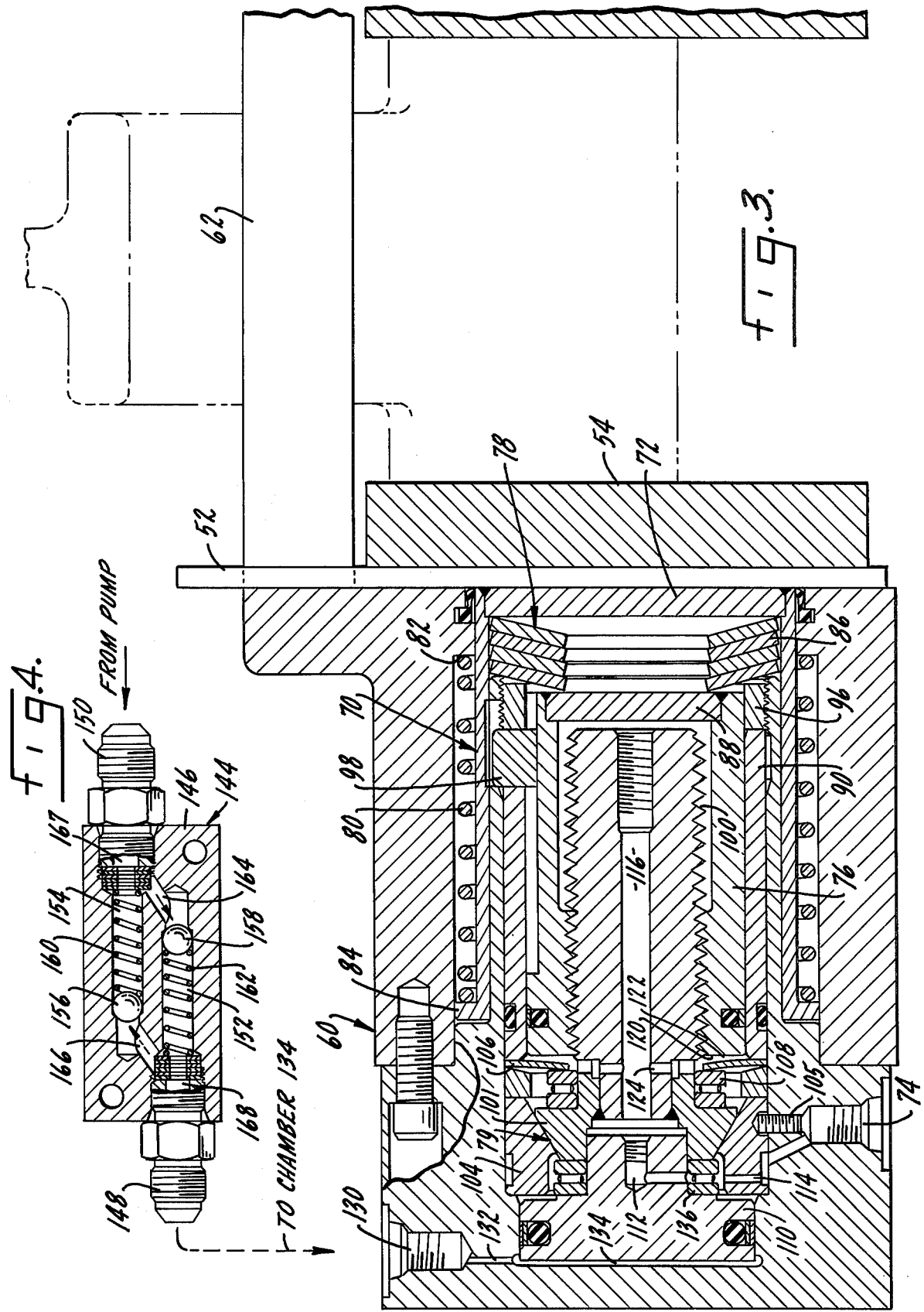

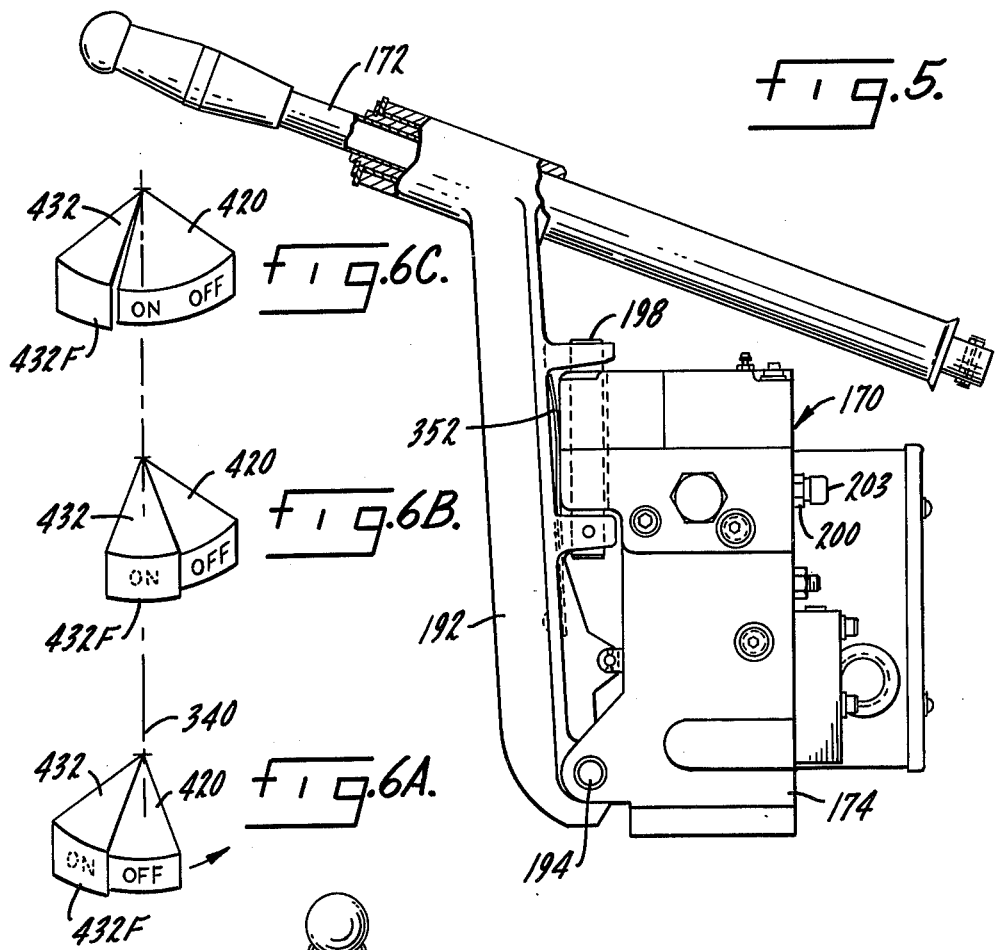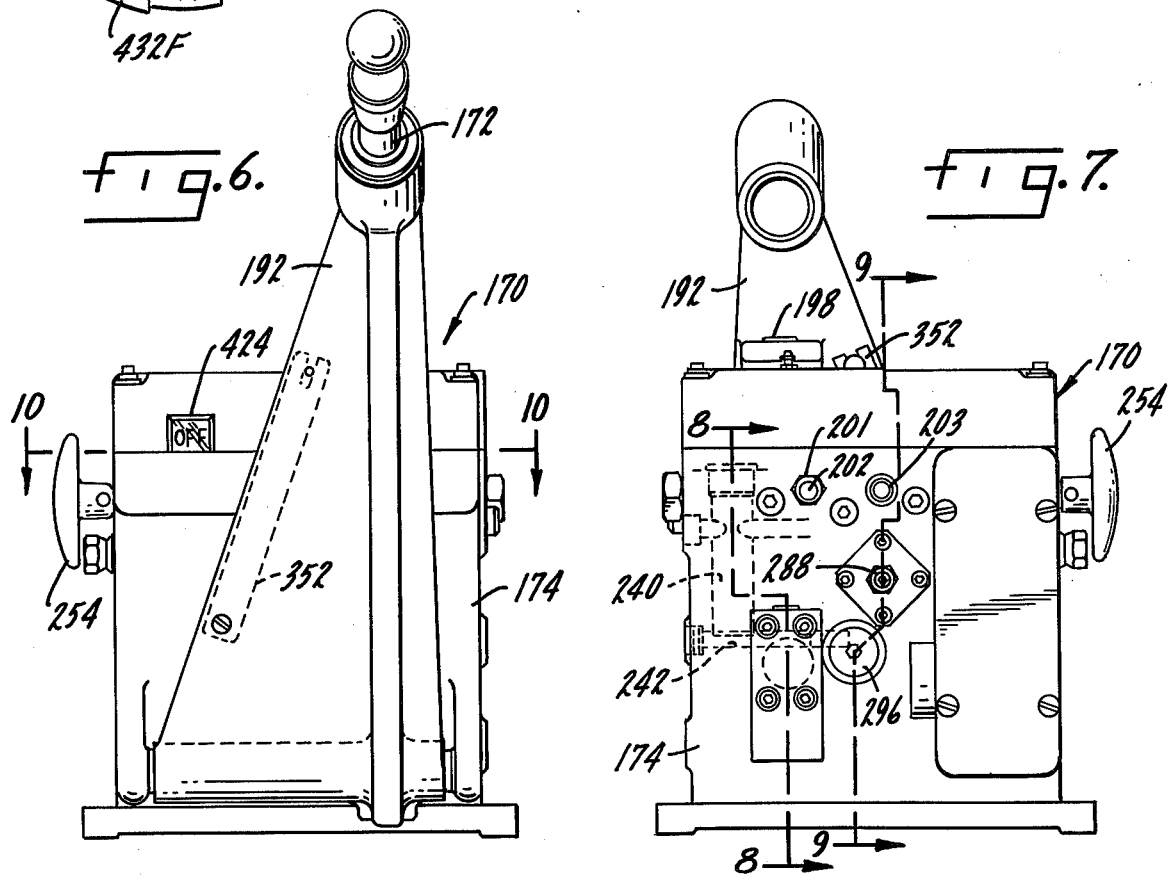

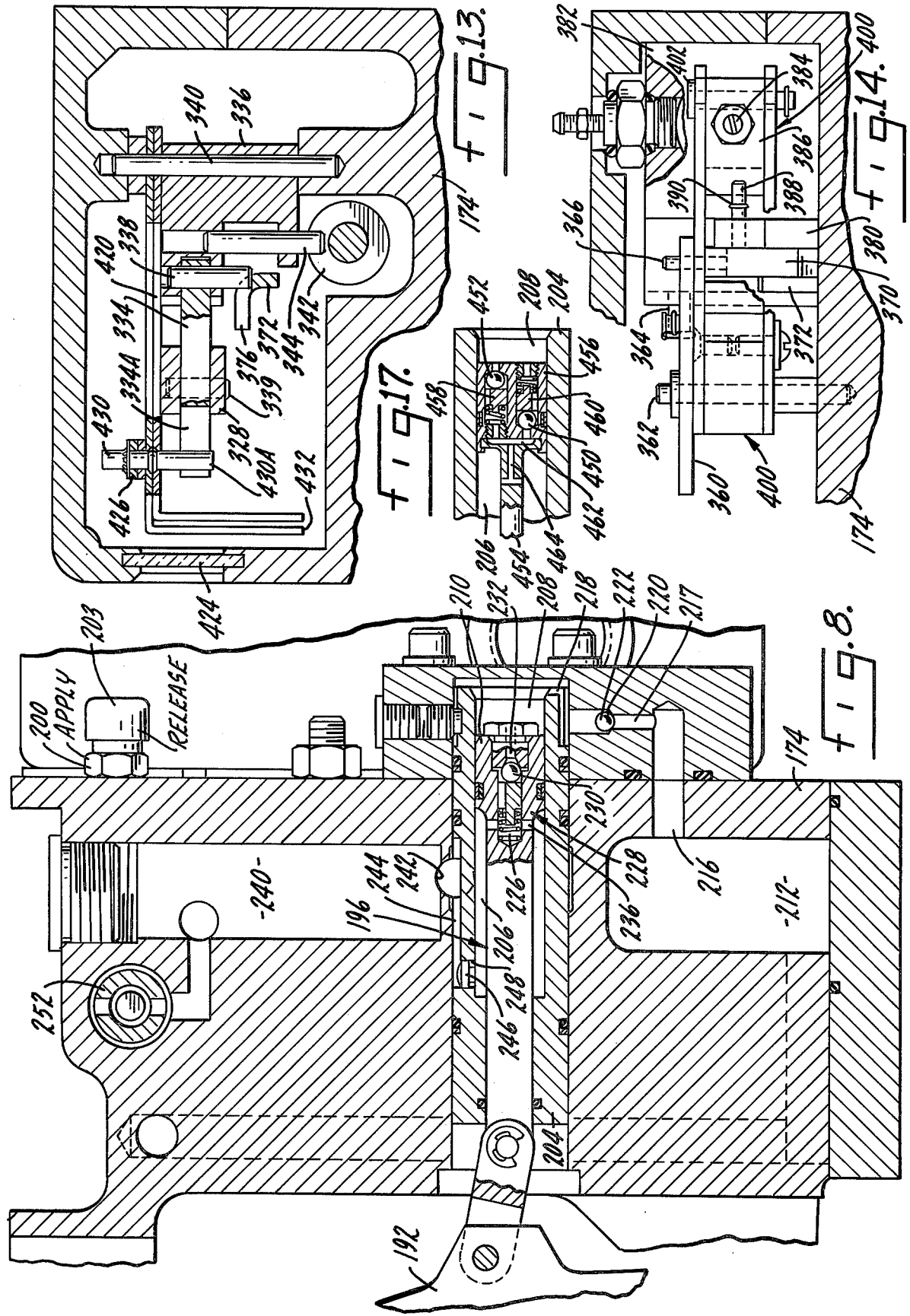

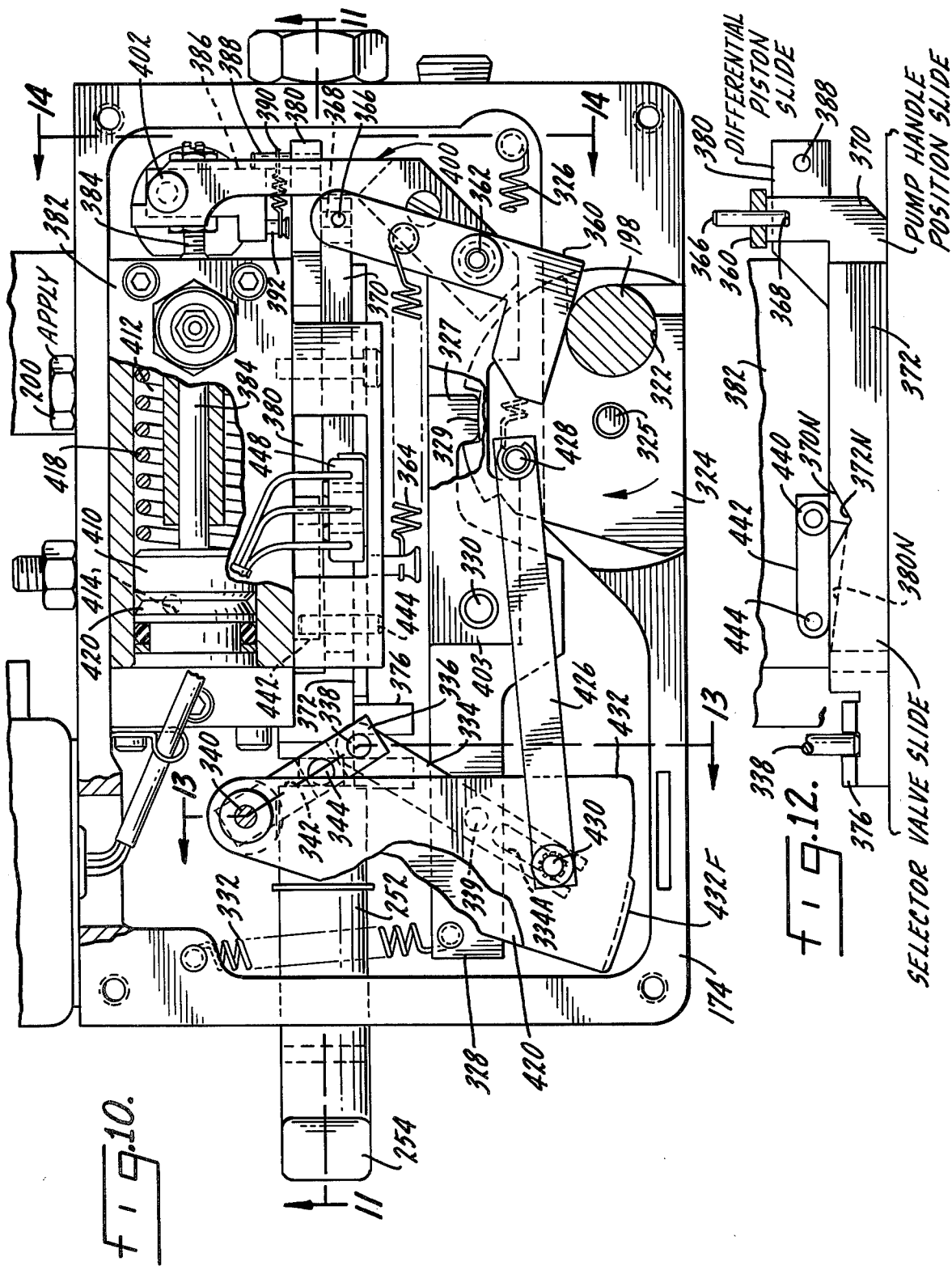

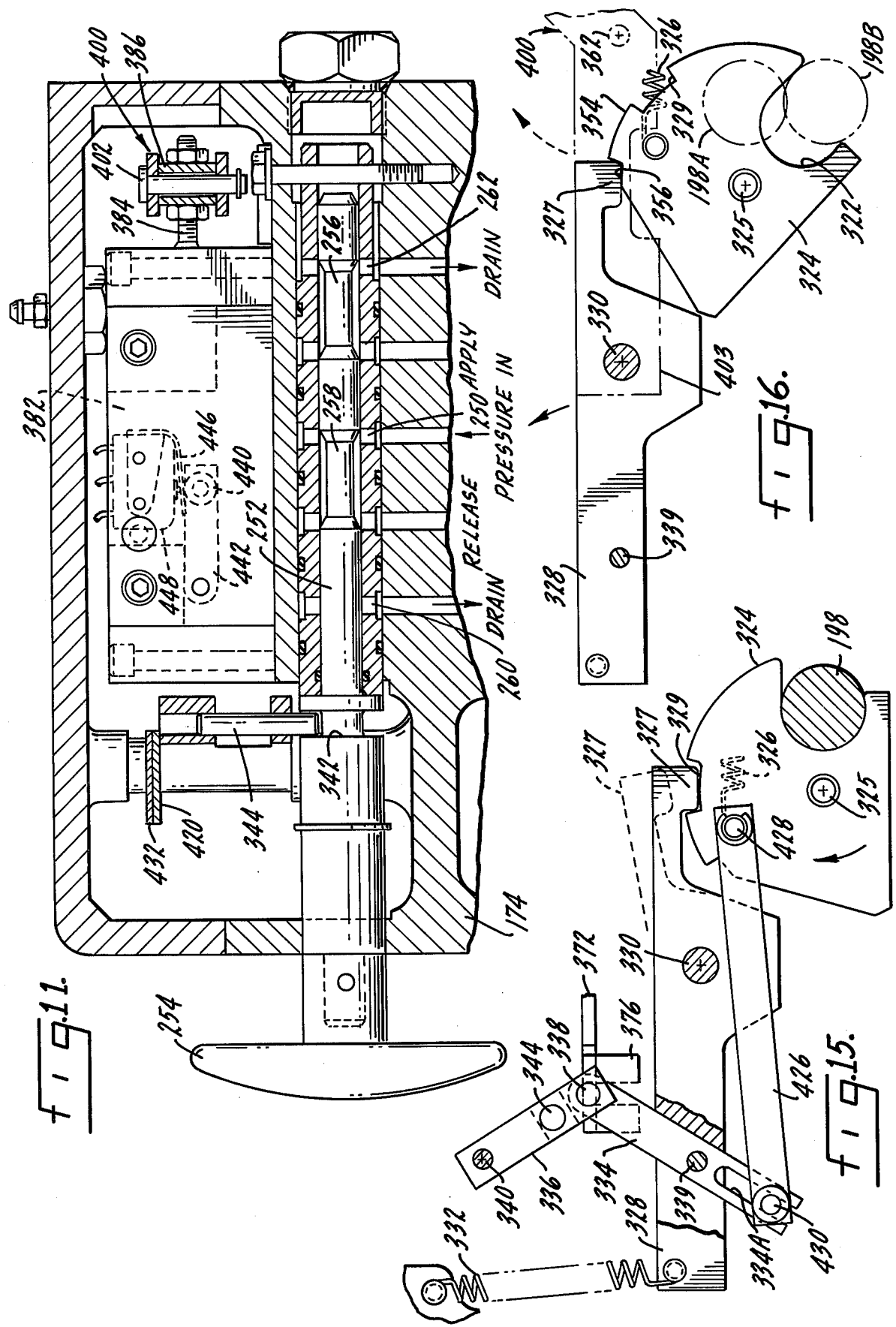

BRAKE APPARATUS INCLUDING LOCKING MEANS THEREFOR

This invention relates to brake apparatus and in particular to brake apparatus in which the brake may be both actuated and released by a hydraulic force, held engaged by a mechanical force applied to the actuator piston and in which a strong spring force, tending to restore the brake applying piston, prevails while the brake is held engaged.

A brake as just described is not new and indeed is disclosed in Jones U.S. Pat. No. 3,746,403.

It is of course necessary that the mechanical lock be released in the course of extending the actuator piston to engage the brake. Also, since the brake is held engaged by a mechanical lock, there is no need to maintain fluid pressure once the brake is held engaged. It is therefore an object of the present invention to so release fluid pressure, after the brake is engaged, as to assure the lock will be set before an appreciable backlash force, such as the aforesaid spring force, has time to work in the reverse sense.

The brake is released by employing a hydraulically applied force to release the lock, whereupon the aforesaid spring force restores the actuator piston. In the instance of a brake caliper, this spring force may not be the only source of a spring force which needs releasing to assure the friction element is indeed displaced from engagement with the brake rotor. Therefore to assure there is ample time for all spring forces to be dissipated in the brake release mode, another object of the invention is to hold the lock disengaged with a force which exceeds a spring force tending to engage the lock. In the preferred mode of practice, as another object of the invention, this holding force may be established by fluid pressure maintained by a check valve; and yet another object of the invention is to so combine this check valve with a second check valve (serving another role) in a single housing that either check valve may play the role of the other, thereby preventing an incorrect installation.

Other objects of the invention are to enable fluid pressure to be created by a pump piston operated manually by a pump handle which cannot be restored to home position unless a pump handle latch is unlocked as an incident to attaining the required force to either engage or release the brake; to release the pump handle for operation as an incident to positioning a selector valve; to sense and register certain conditions in the brake release mode in such a fashion that when these conditions are registered as coincident, a signal will be generated to indicate conditions for brake release have been met; and to indicate the condition (mode) of the brake.

In the drawing:

FIG. 3 is a sectional view of the actuator cylinder employed in the present invention;

FIG. 4 is a sectional view of a check valve assembly constructed in accordance with the present invention;

FIGS. 5, 6 and 7 are elevational views of the hand pump unit embodied in the present invention;

FIGS. 6A, 6B and 6C are diagrammatic detail views of elements used to show the prevailing mode of the brake;

Figure 9:
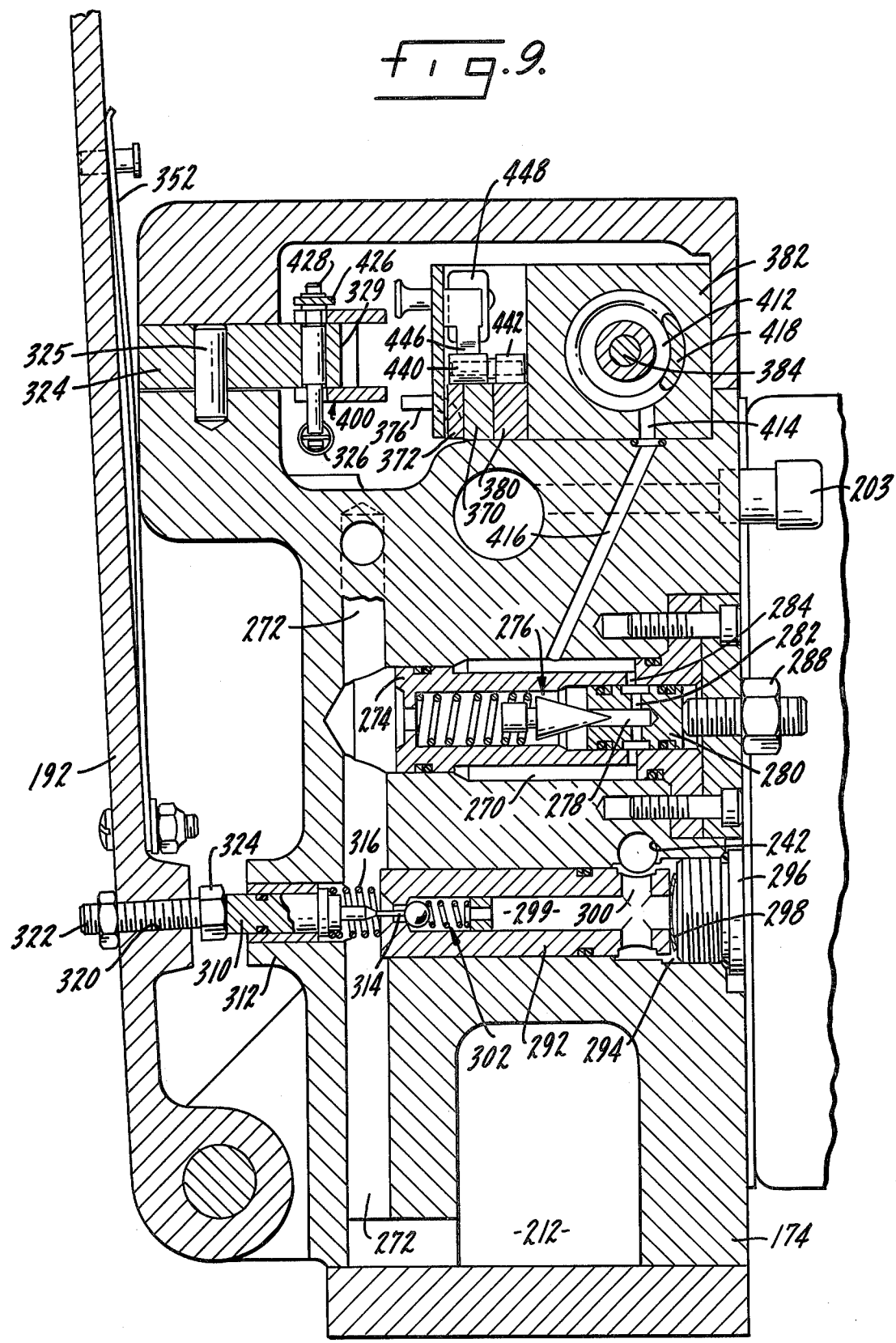

FIGS. 8 and 9 are sectional views respectively on the lines 8—8 and 9—9 of FIG. 7;

FIG. 10 is a plan view, taken on line 10—10 of FIG. 6, partly broken away, of certain parts inside the pump housing;

FIG. 11 is a fragmentary sectional view taken on line 11—11 of FIG. 10 showing other structure inside the pump housing;

FIG. 12 is a fragmentary elevation of certain register slides;

FIGS. 13 and 14 are detail sectional views taken on lines 13—13 and 14—14 of FIG. 10 showing the manner in which certain parts are connected;

FIGS. 15 and 16 are detail views showing the manner in which the latch for the pump handle is operated;

FIG. 17 is a detail sectional view of a modified form of pumping piston.

THE BRAKE ACTUATOR; APPLY AND RELEASE MODES

The wheels W of the railroad vehicle are equipped with brake rotors or discs 50 which rotate with the wheel. The principal brake member for each wheel comprises a support plate 52 (one each on opposite sides of the rotor disc 50) presenting a friction pad 54 (see FIG. 3) for frictional engagement with the disc when the brake is engaged.

Each brake unit comprises a service brake and a parking brake. The service brake comprises two housings 56 and 58 affording brake cylinders which normally will be operated automatically. The parking brake comprises a housing 60 and the present invention is concerned with the manner in which the parking brake is constructed and operated manually.

Each support plate 52 is slotted to fit a guide 62, FIG. 3, on which the plate 52 is free to slide between a brake retracted and brake engaged position. By applying pressure to the support plate 52 its pad 54 will be pressed against the rotor disc and this is accomplished by actuating a cup shaped plunger 70 having a bottom wall 72 normally disposed in engagement with the pad support plate 52.

As will be explained in detail below, plunger 70 is actuated, that is, it is driven to the right as viewed in FIG. 3 when fluid under pressure is admitted to a port 74 in housing 60. This results in forward translation or movement of a piston 76 which flexes a strong spring 78. Spring 78 is interposed between the piston 76 and the plunger or follower 70 so that forward movement of the piston is transmitted to the plunger through the spring.

Full engagement of the parking brake is manifest in spring 78 being almost flattened. The movement is only about 0.060 inch. When the application of fluid under pressure which actuates the brake is discontinued, a friction lock in the form of a cone clutch 79 is effective to hold the parking brake engaged; spring 78 is held in its flexed state and will automatically compensate for thermal expansion or contraction.

The brake actuating plunger 70 is normally in a retracted or unloaded condition, with spring 78 relaxed or unflexed, and such normal position is maintained by a coil spring 80 confined between a shoulder 82 in housing 60 and a collar 84 at the end of plunger 70 opposite the friction pad support plate 52.

Spring 78 is a Belleville spring consisting of four washers 86 arranged in a stack. The piston 76 is provided with an end wall 88 which bears against the innermost one of the spring washers 86 in the relaxed or released condition of the brake.

The piston 76 is confined for axial movement inside a spacer sleeve 90 which in turn is retained within the outer housing 60 by a retainer nut 96.

Piston 76 is free floating in the sense that it is capable of both forward (brake actuated) and reverse (brake released) movement respectively in the right and left hand direction as viewed in FIG. 3. However the piston is constrained against rotative movement and this is accomplished by a key 98 supported by sleeve 90 and disposed in a slot in piston 76.

It has been explained so far that the brake is engaged by driving piston 76 forwardly, that is, to the right as viewed in FIG. 3, resulting in spring 78 being flexed or compressed. Spring 80 is compressed at the same time and both springs are in a compressed state when the brake is engaged. The brake is held in its engaged position by the friction clutch 79 and when this clutch is disengaged the spring force, especially the force of spring 78, retracts piston 76. At the same time plunger 70 is restored. Thus the brake is engaged by fluid under pressure applied to piston 76, but is spring retracted.

In the course of being retracted (brake disengaged) piston 76 slides to the left or rearward as viewed in FIG. 3 but does not rotate for the reason mentioned. The piston is threadedly mounted on a screw 100 which has a large lead thread. Therefore when the piston is free to be retracted (a hydraulic release force is applied as hereinafter explained to disengage the clutch 79) its axial movement, induced by the end thrust of spring 78, causes the screw 100 to turn which is permitted because the clutch is disengaged.

The screw 100 is provided at one end with a cone shaped clutch element 101. In the retracted or brake released position the clutch element 101 is seated on an opposing clutch member 104 secured within the housing 60 by a set screw 105. The clutch element 101 is held in seated position by a spring washer 106 applying a rearward thrust (to the left, FIG. 3) against a needle bearing assembly 108 which in turn thrusts the cone shaped end of the clutch screw against the clutch seat 104.

A release piston 110 is located inside the housing 60 and is employed to disengage the clutch in a manner hereinafter described. This piston 110 includes an internal passage 112 communicating with an internal passage 114 in the clutch seat member 104. Passage 114 in turn communicates with port 74 where fluid under pressure is admitted for actuating the brake.

Passage 112 communicates with a bore 116 drilled through the clutch screw 100. Bore 116 opens at the opposite end of the screw allowing fluid under pressure to be communicated to the rear face of wall 88 constituting part of the effective area of the piston 76.

The effective piston area is enlarged by having the opposite end wall 120 of the piston in communication with a chamber 122 which in turn communicates with the piston bore 116 by a passage 124 drilled through the screw shank.

Therefore when fluid under pressure is applied to port 74, it is communicated to the exposed areas of the piston represented by the areas of the walls 88 and 120. The cone clutch element 101 is therefore unseated, which in actual practice is a separation of just a little more than 0.001 inch. Because the clutch 79 is disengaged, screw 100 is free to turn. Since screw 100 is free to turn, piston 76 travels forwardly, all of which is virtually an immediate response as a result of the large lead angle of the screw, which may be as much as 1¼ inches per 360° turn. Other than the minor axial movement required for clutch disengagement, there is no axial movement of the screw but only rotation induced by movement of the piston.

Eventually the brake is engaged, that is, extension of piston 76 is accompanied by extension of the plunger or follower 70 which in turn forces the support plate 52 to the right as viewed in FIG. 3, causing the friction pad 54 to engage the rotor disc of the wheel. Fluid under pressure continues to be applied, resulting in compression of spring 78.

Delivery of fluid under pressure is discontinued after the applied hydraulic force is deemed sufficient for brake engagement, with spring 78 in its compressed state. It may require nearly 13000 pounds of applied force to flatten the Belleville spring, characterizing the most extreme case of engaged parking brake. Nonetheless, the parking brake holding force may be deemed to be, for example, a minimum of 8200 pounds, which is the clamping force on the brake disc. Such clamping force may be assured by a hydraulic force of about 15000 pounds, causing about 0.060 inch of spring compression.

The spring movement is slight; backlash or end play in the screw-piston actuator may be translated into a loss of about 200 pounds of spring force for each 0.001 inch increment of unwanted piston retraction due to backlash.

To limit end play (backlash) spring 106 applies just enough force to maintain the cone clutch element 101 on the clutch seat. Therefore, when the applied hydraulic force is discontinued and chamber 122 connected to drain, as will be explained, the force of spring 106 thrusts the piston 76 rearward, tightly seating cone 101 thereby engaging the clutch 79. With the clutch engaged, the screw cannot rotate and piston 76 is locked in its advanced position, locking the parking brake.

It is important that clutch engagement be so accomplished that backlash is minimized; five degrees of screw turn can mean 0.0175 inch of spring stack (78) relaxation (or compression as the case may be); one degree of screw turn means 0.0035 inch end play; and besides the large lead on the screw requires considerable thread clearance. To assure efficient clutch engagement once the brake is engaged and to prevent backlash by a sudden rearward thrust of spring stack 78 on piston 76, fluid under pressure is not suddenly released from chamber 122 but rather a means is afforded (in the form of an orifice as explained hereinafter) to release the pressure slowly at port 74; indeed loss of pressure is prevented for a thousandth of a second or so, allowing spring 106 to instantly engage the clutch once the application of fluid pressure is discontinued. All of this occurs when the force is sufficient for brake engagement: application of pressure is discontinued; the clutch is engaged to lock the brake in its engaged mode; and chamber 122 is then depressurized. By this procedure, the spring stack 78 cannot thrust piston 76 rearward by any appreciable amount when pressure is relaxed in chamber 122. Chamber 122 is depressurized in a manner to be explained.

It has already been mentioned that when the brake is released, piston 76 is restored from its advanced position by the action of spring 78. However, to release the brake involves the application of fluid under pressure, applied at port 130, FIG. 3. Port 130 is connected by a passage 132 to a chamber 134 inside the housing 60 where the brake release piston 110 is located.

When fluid under pressure is applied to chamber 134 (chamber 122 was previously depressurized as will be explained) piston 110 is actuated. A thrust bearing 136, of needle form, is interposed between piston 110 and the end of clutch element 101. Therefore when piston 110 is actuated its forward movement is transmitted to clutch element 110 through the bearing 136, displacing clutch element 101 which characterizes clutch disengagement.

With the clutch disengaged, screw 100 is free to turn. This being so, piston 76 is free to be retracted by the return force of spring 78, released as a result of clutch disengagement.

As long as the clutch is disengaged, only about one hundred pounds of force is needed to retract the piston. Spring 80 is inadequate to supply all of this force and therefore spring 78 is really responsible for retracting the piston; spring 80 causes the follower 70 to follow.

Brake engagement, in the example given, involves only 0.060 inch of flexure of spring 78 during compression. Spring movement during brake release will be the same amount of course. Nonetheless, provision is made, in accordance with the present invention, to hold the clutch disengaged during the brake release mode with a force on piston 110 which exceeds the force applied by spring 106 to seat cone 101.

Figure 2:
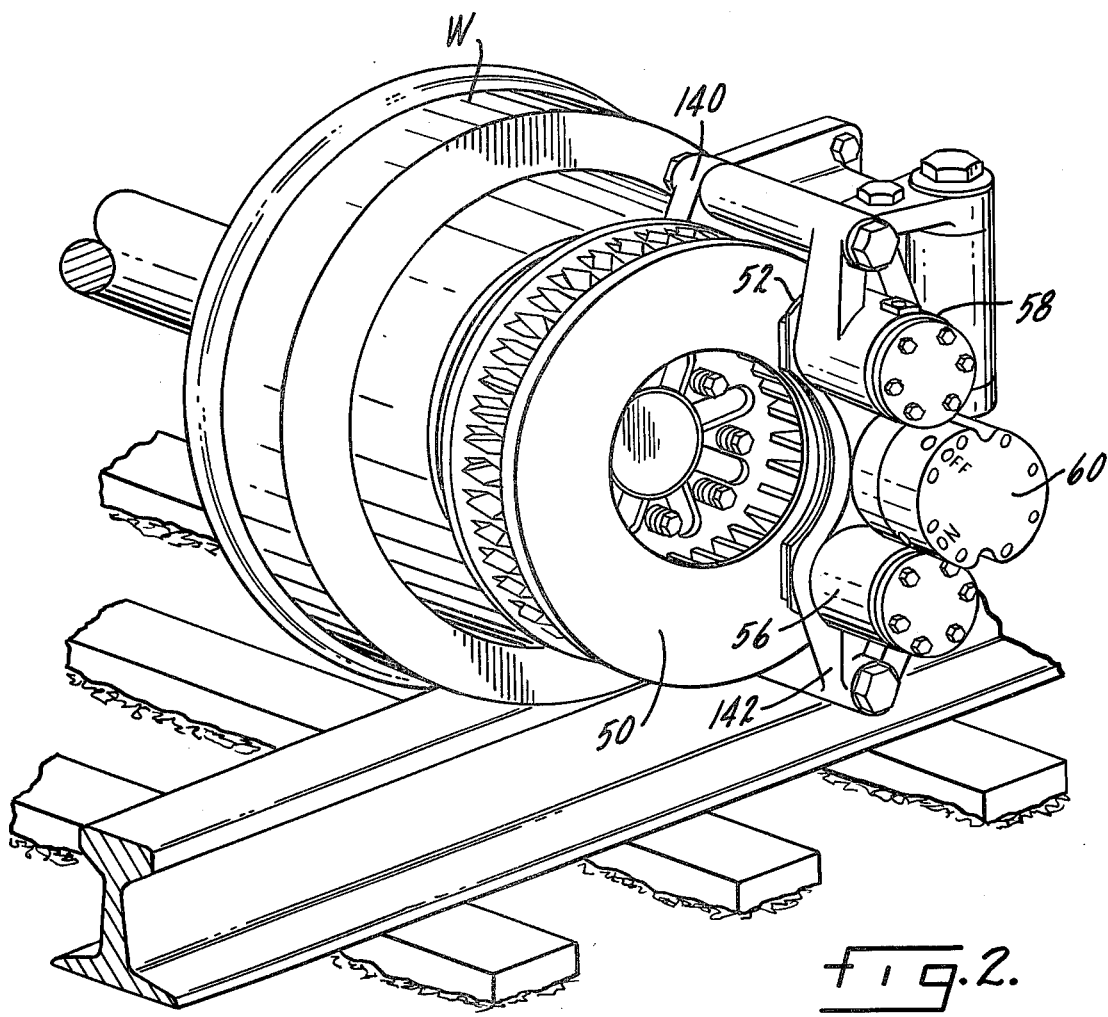
FIG. 2 is a perspective view on a greatly enlarged scale compared to FIG. 1 showing a disc brake and related caliper as viewed substantially on the line 2—2 of FIG. 1.

The reason for holding the clutch disengaged is this. Referring to FIG. 2, the service brakes may also be applied at the time the parking brake is applied, producing flexure (a stored "spring" force) in the caliper back plate 140, FIG. 2, or the caliper support plate 142.

There may therefore be flexure (stored spring force) in the caliper assembly greater than the travel of the piston 76 (0.060 inch) used for the parking brake application. Assuming, then, concurrent release of both the service brake and the parking brake, the piston of the parking brake may be fully retracted (clutch 79 engaged) before all flexure is removed from the caliper assembly. If this should happen the friction pad 54 would remain engaged with the brake rotor.

Therefore, to assure that piston 76 and screw 100 may be allowed to be influenced by "return" forces other than the restoring action of spring 78, means are afforded to hold clutch 79 disengaged in the brake release mode. This is achieved by holding a pressure of say 250 psi, maintained in chamber 134, by a pressure relief valve 144, FIG. 4, positioned, as shown in FIG. 1, between the parking brake and the hand pump unit.

Figure 1:
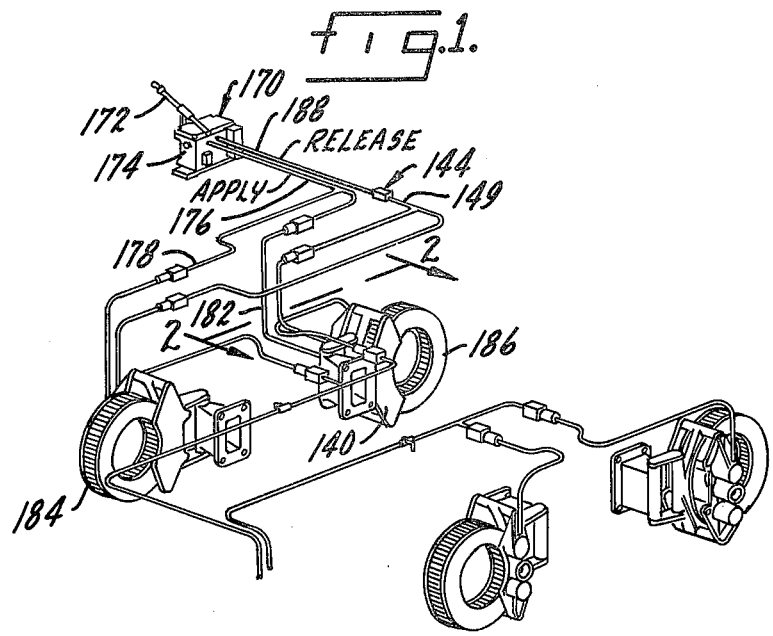
FIG. 1 is a perspective view of a brake system incorporating the brake apparatus of the present invention.

With regard to the check valve 144, it includes a one-piece housing 146, a downstream fitting 148 (port) to be connected to the conduit 149 leading to release port 130 of the actuator and an upstream fitting 150 (port) to be connected to a conduit (188) leading from the hand pump unit, as shown in FIG. 1. There are two hand brake actuators for the two discs 184 and 186, FIG. 1, so conduit 149 is branched, allowing check valve 144 to service the two actuators.

The check valve 144 is provided with two (parallel) internal passages 152 and 154 each confining a related one-way ball check 156 (upstream or reverse flow only) and 158 (downstream, but not upstream flow) and related return spring 160 and 162. Adjusting screws are provided, FIG. 4, to enable the effectiveness of each compression spring to be varied.

The check valve 144 is reversible; either ball check may be employed to permit unimpeded downstream flow to actuate the release piston 110. As shown in FIG. 4, ball check 158 will be unseated by fluid under pressure entering chamber 152 from conduit 188. There can be no return flow through chamber 152.

Passages 152 and 154 are parallel; their upstream ends are communicated to port 150 and the downstream ends communicate with port 148 respectively by cross-passages 164 and 166.

There are, in essence, few parts for the check valve assembly: the housing, the two fittings, the two check valves and the two springs.

Fluid under pressure from the pump is checked in chamber 154 by ball 156 opposed to the opening or port 167 which receives fluid under pressure and of course opening 167 communicates with passage 166.

On the other hand, reverse flow in chamber 152 is checked by ball 158 and takes place through cross passage 164 which communicates with the opening or port 168 which communicates with port 130. By adjusting spring 160, it is possible to predetermine the pressure to be maintained in chamber 134 for holding the clutch disengaged during the brake release mode. Spring 162 may be adjusted independently to predetermine the force required to unseat ball 158 to admit fluid to chamber 134 to disengage the clutch in the first place.

THE HAND PUMP

Fluid pressure for engaging the brake and for operating the release piston is furnished by a hand pump unit 170, FIG. 1. Pressure is established by operating a pump handle 172 fulcrumed on a pump housing 174. Fluid under pressure for applying the parking brake is furnished by a conduit 176 connected to an outlet port on the pump housing. Conduit 176 has two branches 178 and 182 respectively connected to a port as 74, FIG. 3, of each of the two parking brakes associated with the two wheel discs 184 and 186, FIG. 1, on one side of the corresponding railroad car. Another conduit 188 is connected to the pump housing and this conduit includes the relief valve assembly 144, FIG. 4, as already explained.

As shown in FIG. 5 the pump handle 172 is really an extendible arm of a lever 192 fulcrumed at 194 on the pump housing. A pumping piston 196 is connected to arm 192 as shown in FIG. 8. The arrangement is such that after a predetermined number of strokes the operator feels resistance indicating the spring stack 78 is being flattened and therefore piston 196 has created enough pressure to produce engagement of the parking brake with the desired force applied to the brake member as 52.

The pump handle or lever is normally held stowed in a predetermined position and indeed must be so stowed as standard operating procedure. The stowed position in the present instance is represented by a pin 198 captured by a latch as hereinafter explained. However, the handle cannot be stowed unless sufficient pressure has been created to engage the brake. When the handle is stowed, after engaging the brake, chamber 122 of the actuator is depressurized.

A fitting 200, FIG. 5, on the pump housing, incorporates an orifice restrictor 202 which retards depressurization of chamber 122 for the reason given above. Thus, fitting 200 is considered the "apply" port of the pump housing to which conduit 176 is connected, FIG. 1. Also when chamber 122 is depressurized, after the brake is engaged, fluid in chamber 122 returns through fitting 200 and it is at this time that orifice 202 exerts its influence.

When the brake is to be released, fluid under pressure is delivered from a port 203, FIG. 7, incorporated in a fitting on the pump housing and this port can therefore be considered the "release" port.

The pumping piston 196 reciprocates within a sleeve 204, FIG. 8, secured in the pump housing. The internal bore of sleeve 204 is enlarged to provide a pair of chambers 206 and 208 which are separated by a head 210 on the piston.

The piston 196 is double acting and reciprocates above a reservoir 212 located within the pumping housing 174. When piston 196 is stroked in one direction, fluid is withdrawn from reservoir 212 and delivered to chamber 208; at the same time fluid is forced to the actuator. When the piston is stroked in the opposite direction an additional quantity of fluid is pressurized for delivery to the parking brake actuator.

Chamber 208 communicates with reservoir 212 by way of passages 216, 217 and 218. Passage 217 is enlarged to provide a seat 220. A ball 222 sets in seat 220 to afford a gravity controlled check valve within the passage communicating chamber 208 and reservoir 212.

The head of the piston is provided with an internal chamber 226. A spring loaded check valve 228 is positioned in chamber 226 and is normally effective to dispose a ball 230 in closing position against a port 232 inside the head of the piston which communicates chambers 208 and 226.

Chamber 226 inside the piston head is communicated to chamber 206 by a cross-passage 236.

When piston 196 is moved to the left, FIG. 8, check valve 230 is forced closed, chamber 208 is expanded by virtue of the retracting piston head, ball check valve 222 rises and fluid is delivered from chamber 212 into chamber 208. At the same time fluid in chamber 206 is pressurized.

Conversely, when piston 196 is driven to the right, check valve 222 is seated, check valve 230 opens and fluid under pressure surges through port 232 and passage 236 into chamber 206.

Chamber 206 communicates with a large chamber 240 in the pump housing by way of a transverse bore 242 which in turn communicates with a reduced section 244 of sleeve 204; a check valve in the form of a flap 246 is arranged in a port 248 which communicates the reduced area 244 with the pumping chamber 206.

The entire system is normally filled with hydraulic fluid and hence when fluid in chamber 206 is pressurized, flap valve 246 is opened to pressurize chamber 240. A port 248 communicates chamber 240 (by way of a passage not shown) with a port 250, FIG. 11.

To set the hand pump unit in either the "brake apply" or "brake release" mode of operation, a valve spool 252 is employed, FIG. 11. This spool is positioned manually by handle 254. By shifting spool 252 to the left as viewed in FIG. 11, groove 256 of the valve spool connects pressure port 250 to the "apply" port 202, FIG. 7, whereafter repeated reciprocation of the pumping piston pressurizes chamber 122 of the actuator. Also, when the valve spool 252 is positioned to the left, groove 258 therein connects a drain passage 260 in the pump housing to the release port 203, FIG. 7, so that any fluid trapped in chamber 134 (trapped by check valve 156 when the brake was released) will be returned to reservoir 212 when there is enough pressure in chamber 122 to overcome check valve 156.

Conversely, when spool 252 is restored to the right, to release the brake, it then occupies the position shown in FIG. 11 where pressure "in" port 250 is connected to the release port 203 while the apply port 202 is connected to a drain port 262.

RELIEF VALVE

To protect the system from excess pressurization, a relief valve senses the pressure in chamber 240 and drains chamber 240 back in the reservoir in the event excessive pressure is established. Thus, as shown in FIG. 9, housing 174 is formed with an internal chamber 270 and there is a line 272 (drain) which communicates with the reservoir 212.

A sleeve 274 is positioned in chamber 270. A spring biased relief valve 276 is positioned in a bore in sleeve 274 and is normally closed on a port 278 formed in a plug 280, inserted in sleeve 274.

Plug 280 is provided with a transverse passage 282 which communicates port 278 with a transverse passage 284 in sleeve 274, which in turn communicates with chamber 270.

Thus, when check valve 276 is unseated by excessive pressure in chamber 270 it communicates chamber 270 with the drain passage 272 and any fluid in chamber 270 is returned to the reservoir.

Chamber 270 communicates by way of a passage (not shown) with chamber 240, FIG. 8, so that chamber 270 at all times is identified with the pressure prevailing in chamber 240 by which the brake actuator piston chamber 122 is serviced. In the event the pressure setting of valve 276 is exceeded (set by an adjusting screw and nut 288) the needle type check valve 276 is opened and the pumping piston, if operated, only returns fluid to the reservoir.

PRESSURE RELEASE CHECK VALVE

When the pump handle (lever 192, FIG. 9) is stowed in the position shown in FIG. 9, it activates a pressure release check valve to depressurize the pump, the apply line or the release line from the pumping unit to the check valve 156.

The pressure release check valve is positioned below the pressure relief check valve as shown in FIG. 9. A sleeve 292 is positioned in a chamber 294 inside the pump housing. This chamber is closed at one end by a plug 296. A retainer spring 298 holds the sleeve 292 in place.

Sleeve 292 is formed with an internal bore 299 and cross passage 300 communicating with a passage 242, FIGS. 8 and 9, which communicates with pressure chamber 240.

A check valve cartridge 302 is located in bore 299 and presents a check ball normally seated by a spring.

A plunger 310 is located in the bore of a boss 312 provided on the pump housing, FIG. 9. The plunger has a stem 314 for disengaging the ball check valve 302 when the plunger 310 is moved to the right (FIG. 9) against the action of a return spring 316.

The lever 192 for reciprocating the pumping piston 196 is provided with a tapped opening 320 in which is located an adjusting screw 322 having a head 324 which engages plunger 310 in the course of stowing the handle. When the pump handle is located in home position, plunger 310 is actuated to open the check valve to depressurize chamber 240.

Pump Handle Latch and Monitor Slides

The pump handle is normally retained in a stowed position by a latch means; it cannot be removed from latched position unless the valve positioning handle is moved to a new position. The latch means is released as an incident to re-positioning the valve selector handle 254. This gives assurance the pump handle will not be employed by anyone unless the pump handle is to be used in accordance with the standard operating procedure.

The pump handle cannot be stowed unless adequate pressure required to actuate the brake, or release the brake, has been attained. This gives assurance that in all probability the brake has indeed been set or released. To make this possible, the released latch is held in a position where it is a barrier preventing the pump handle from being returned to home position; a monitor means senses the pump pressure and when the pressure is adequate the monitor is effective to remove the force which holds the latch in its barrier position.

The pump handle pin 198, FIG. 10, in the stowed (home) position is located in a notch 322 of a latch disc 324 which turns on a pivot pin 325 supported in the pump housing. The latch disc is urged clockwise, FIG. 10 (also note FIG. 15) by a strong spring 326 but is normally held against rotative movement by a latching dog or pawl 327, located at one end of a latch arm 328, to fit in a notch 329 in the latch disc. Latch arm 328 is pivoted on a pin 330 (floating) and is urged clockwise (FIG. 10) by a spring 332.

By pivoting the latch arm 328 counterclockwise, pawl 327 will be released from notch 329. Spring 326 is then free to turn the latch disc, forcing pin 198, and therefore the pump handle, outwardly. The latch arm is pivoted in this manner serving as a means to release the latch, each time the valve handle 254 is relocated. In this connection it will be noted a pair of links 334 and 336 are connected at adjacent ends by a toggle joint pin 338; link 334 at the other end is pivotally connected to the latch arm 328 by a pin 339 and link 336 at the other end is pivoted on a pin 340.

The toggle link 334–336 responds to movement of the valve handle. To this end, the shaft of the valve spool, FIG. 11, is provided with a groove 342 in which a pin 344 is disposed. Pin 344 is captured by link 336, FIG. 11, so that when the valve handle 254 is pulled out or pushed in, the toggle link is straightened as it passes over-center which causes latch arm 328 to swing on its pivot to release pawl 327 from notch 329 as best shown in FIG. 15. Spring 326 then takes over, rotating the latch disc clockwise, FIG. 15. Pin 198 on the pump handle is released. The pump handle 192, FIGS. 5 and 6, is provided with a leaf spring 352, which is effective to "pop" the pump handle (lever) outward when the latch is released.

When the toggle passes through its dead center position, the latch arm tends to be restored by spring 332 so that pawl 327 engages a rise 354, FIG. 16, on the latch disc and is eventually seated in a stop notch 356 provided by the latch disc.

The latch disc is shown in its released position in FIG. 16, where the home position of the pumper lever is shown by the pin 198 in position 198A. As noted, latch 324 is held in its released position by pawl engaging stop 356 on the latch, that is, the latch 324 cannot be returned to its normal set position until pawl 327 has been displaced upwardly. This being so, the latch when released is a barrier to restoration of piston 198 in that if there is an attempt to restore the pump handle pin 198 is stopped at position 198B by latch 324 which interdicts the path of pin 198 moving toward home position.

A means is provided, as explained below, to displace pawl 327, FIG. 16, when adequate pressure is established. With pawl 327 displaced, pin 198 (pump handle) can be moved from position 198B to position 198A, the home position; the latch will be restored as an incident since its only effective resistance is spring 326.

There is a sensing means to sense the position of the pump handle, both released and stowed. Such sensing means is in the form of finger 360, FIG. 10, pivoted at 362 on the pump housing and biased counterclockwise by a spring 364, causing and edge of the sensing finger to engage the pin 198 in its stowed position. At the same time (pump handle stowed) a pin 366 at the distal end of the sensing finger 360, engaged in a notch 368 of a slide 370, locates that slide in a right hand limit position, FIG. 12. Slide 370 (like two other slides identified below) is guided and supported for lateral movement inside the pump housing in a manner not shown.

On the other hand, when the handle is released in the manner explained above, pin 198 is displaced from engagement with finger 360 and spring 364 pivots the latter counterclockwise, driving slide 370 to the left as viewed in FIGS. 10 and 12.

Slide 370 thus registers the position of the pump handle. Slide 370 is one of three slides which must be keyed to generate a signal of compliance with the precedent conditions for a released parking brake.

A second such slide, registering the position of the valve handle, is identified by reference character 372 in FIGS. 10 and 12. This slide also has a notch at one end presented by a pair of outwardly bent lugs or ears 376 (see FIG. 13) which capture the lower end of the pin 338, FIG. 13, which articulates the toggle link.

When the valve selector slide 252 is in the position shown in FIGS. 10 and 11 ("in") and the pump has been properly cycled, the brake actuator is in the "brake off" condition, that is, the parking brake is released. Register slide 372 at this time is in its right-most position, FIG. 12. When the valve selector 252 is moved to the left ("out") this is one condition precedent to engaging the brake and slide 372 is shifted to the left, FIG. 12, registering this condition.

There is a third register slide 380, FIG. 12, which is actuated in response to a sensor determining that adequate pressure (about 5000 psi) has been established, either to actuate the brake or release the brake. The means to sense pump pressure is a differential piston to be described in detail below, confined inside a housing 382, FIG. 10, located at the upper part of the pump housing 174.

The differential piston has a stem 384, FIGS. 10 and 11, extending outward of the housing 382. Stem 384 supports a lug 386 so that lug 386 extends or retracts with the piston stem 384.

The register slide 380 has a pin 388 projecting into the path of lug 386 as shown in FIG. 10. A restoring spring 390 joins pin 388 to a pin 392 on lug 386.

When the differential piston extends, slide 380 is moved to the right by lug 386 engaging pin 388. When the differential piston is retracted, due to pressure decline, lug 386 retracts slide 380 through spring 390.

As will be explained in more detail below, the register slides 370, 372 and 380 each carry indicium and when these indicium are aligned a lamp is lit (or other signal is created) to indicate that conditions have been complied with for the brake release mode.

In addition to operating slide 380, the differential piston stem 384, when fully extended, is responsible for disengaging pawl 327 from stop 356, allowing the pump handle to be stowed. This assures that the required fluid pressure to engage or release the parking brake must be established; otherwise, the pump handle cannot be restored to home position.

Thus, as shown in FIGS. 10 and 16, a latch release crank 400 is pivotally mounted at 362 where the sensing finger 360 is pivoted. This crank at one end is attached to a pin 402, FIG. 10, which in turn is carried by the lug (clevis block) 386 attached to the piston stem 384 as shown in FIGS. 11 and 14.

The opposite end portion 403 of the crank 400 is joined to the latch arm 328 by pin 330, as best shown in FIG. 16. As long as crank 400 is immobile, pin 330 serves as the pivot for the latch arm 328 as already described. However, when the crank 400 is operated (pivoting clockwise at 362) as a result of extension of the differential piston stem 384, pin 330, FIG. 16, serves to throw the latch arm 328 counterclockwise about pin 339 as a center, disengaging pawl 327 from the stop shoulder presented by notch 356 on the latch disc 324.

Differential Piston

As noted above there is a stem 384, FIG. 10, on a differential piston constituting a means to allow the latched disc to be restored so it will not block or interdict the path leading to the home position of the pump handle pin 198.

The differential piston itself is identified by reference character 410, being disposed in the chamber 412 presented by housing 382.

Chamber 412 is communicated by means of a port 414, and a passage 416 (FIGS. 9 and 10) to chamber 270 where high pressure prevails during operation of the pump handle.

As will be recognized from FIG. 10 the side of the differential piston 410 exposed to port 414 is of greater area than the stem side of the piston. A spring 418 normally positions the differential piston against a stop 420 within its cylinder but this is not a tight fit; to the contrary, high pressure fluid at port 414 is delivered against the large area of the piston 410.

The opposite side of the piston 410 is also exposed to high pressure fluid by a passage (not shown) but when the forces on the large area of the piston 410 exceeds the combined force of the fluid and the spring 418 on the opposite side the differential piston 410 is driven forcefully to the right as viewed in FIG. 10, pivoting crank 400 clockwise (see FIG. 16) to release pawl 327 and to drive the register slide 380 concurrently to the right as viewed in FIG. 10.

Brake Mode Indicator; Warning Flag

Means are provided to display intelligently the condition of the brake actuator, that is, whether the brake is ON or OFF or undetermined. There is therefore a signal indicator segment 420, FIG. 10, which is repositioned each time the valve selector 252 is operated. The indicator segment 420 has the legend ON and the legend OFF printed thereon, FIG. 6C, corresponding respectively to the brake engaged and brake released modes.

The indicia thus carried by the indicator segment 420 are aligned with a window opening 424 shown in FIGS. 6 and 13.

As already mentioned the valve selector handle 254, FIG. 10, is in the brake released position. Accordingly, the indicium OFF appears in the window opening. However, when the selector handle is shifted to the left the indicator segment 420 is moved counterclockwise, positioning the legend ON in the window opening. This is accomplished by fixing a pin 430 to the segment 420 and capturing pin 430 in a bifurcation 334A at the end of toggle link 334 shown in FIG. 15.

A signal flag is employed to indicate that the brake mode is indeterminate. The brake mode is deemed indeterminate any time the pump handle is not stowed in home position. Therefore, though the word OFF or ON will be positioned in the window opening at any one time, the word is masked until after the pump handle is stowed.

The latch disc 324 is responsive to the position of the pump handle and is employed to operate a warning flag which may indeed by a red indicator which in effect masks or closes window 424 as long as the pump handle is released.

As shown in FIG. 10 a link 426 is connected at one end to disc 324 by a pin 428 and at the other end is connected by a pin 430 to a segment 432 pivotally mounted on pin 340. It will be noted from FIGS. 10 and 13 the two segments 420 and 432 both pivot (independently) on pin 340 while each is "thrown" independently by a pin 430A on link 334 (responsive to movement of the selector valve) and a pin 430 on link 426 which is responsive to movement of the latch disc 324.

For example, with the selector valve in the position shown in FIG. 10, and with the pump handle stowed, FIG. 10, the word OFF is displayed in window 424 and can be seen. When the selector valve is manually actuated, to the left, FIG. 10, incidental to establishing the brake actuated mode, segment 420 is moved to the right as shown by the arrow in FIG. 6A to locate the word ON in the window; but at the same time the pump handle latch is released, swinging flag segment 432 to the right so that its red flag 432F, FIG. 6B, is behind the window obscuring the legend ON.

When the pump handle is pressed to home position, after engaging the brake, flag segment 432 is swung back to the left, FIG. 6C, and the word ON is revealed.

Release Mode; Release Signal Generated by Coincident Conditions

After the brake is applied and the pump handle is stowed, the red flag has been displaced from the window and the indicator shows ON, FIG. 6C. The valve selection handle 254 is in its outward position.

To release the brake, the valve selection handle is pushed inward, occupying the position shown in FIG. 10 where the valve spool is positioned so that pressure port 250 communicates with the release porting (identified with conduit 188) which supplies pressure to release the brake; the APPLY porting associated with the "apply" conduit 176 is connected to drain, to the reservoir that is.

At the same time, the toggle link 334–336 is straightened, resulting in pin 198 being unlatched, releasing the pump handle for operation.

When valve selector is moved inward to select the brake release mode, its slide 372 is so positioned that indicium thereon, a notch 372N (which may also be considered a cam dwell) is disposed opposite a follower 440, which is the position shown in FIG. 12.

Follower 440 is carried on a finger 442 pivoted at 444, FIG. 12. Follower 440 is disposed opposite an actuator 446 of a switch 448, FIGS. 9, 10 and 11.

When the pump handle is released, its register slide 370 will be moved to the left (out of the position shown in FIG. 12) and the notch 370N therein will be displaced away from the follower 440, lifting it and preventing the follower from actuating the switch. Now, the pump handle may be operated to develop enough pressure in chamber 134, FIG. 3, to disengage the clutch, say about 5000 psi.

Slide 380 has a long notch 380N therein. When the differential piston stem is extended as an incident to the differential piston sensing that the desired predetermined pressure for releasing the brake has been attained, notch 380N is presented to the follower. This also, as previously stated, unlatches disc 324 allowing stowing of the handle. Now the selector valve is already in the release mode and the pressure is high enough so that stowing the handle will return slide 370 allowing the follower 440 to fall in place which actuates switch 448.

Follower 440 therefore releases the actuator 446 of switch 448, FIG. 11, and a corresponding signal (remote) is generated to signify that conditions for releasing the brake have been complied with.

When the pump handle is stored, the register slides are latched in the actuated mode (follower 440 down). In the brake applied mode moving of the selector handle 254 causes the follower 440 to be lifted and deactivate switch 448. The reason is that when the selector valve is moved outward, notch 372N on slide 372 is displaced from the follower 440 so that in the brake apply mode the follower is lifted even though the other two slides may present their notches to the follower at the end of the brake apply mode cycle lifting the follower release catch 442 from notch 380N allowing it to be pulled back to its starting position.

When the pump handle is stored in home position, after releasing the brake, the pressure release valve 302, FIG. 9, is actuated dumping all pressure in chamber 134 behind the release piston 110, FIG. 3, except for that retained by check valve 156, FIG. 4. However in the next cycle, which will be the brake apply mode, the pressure established in the actuator chamber will overcome the residual pressure in chamber 134, forcing check valve 156 open and restoring the release piston 110. It will be recognized that the dual check valve structure shown in FIG. 4 has no correct or required orientation positioning for installation. The check valves 156 and 158 are indentical mirror images of one another and consequently both check valves 156 and 158 at the time of installation are adjusted to hold a minimum pressure in chamber 134 and it therefore makes no difference which of the fittings 148 and 150 is connected to the release port 130. There can, therefore, be no error when installing the dual check valve assembly shown in FIG. 4. In other words even though check valve 158 will be held closed by the same spring force as check valve 156 (so that check valve 158 could play the role of check valve 156 in the reverse position) this makes no difference because the pressure for releasing the brake will be at a much higher value.

SUMMARY

A. Setting the Parking Brake

The valve handle 254 is pulled to the left, FIG. 10, outward to communicate port 250, FIG. 11, with the APPLY porting in the pump housing. Pawl 327, FIG. 15, is rotated to release the pump handle latch 324. The pump handle is spring urged outward to its accessible position.

Pawl 327, FIG. 16, locks latch 324 in its released position. This prevents the pump handle from being stowed until sufficient hydraulic pressure is obtained as determined by the differential piston 410, FIG. 10, which when actuated will release pawl 327 and allow the operator to thrust the pump handle to home position.

By operating the pump handle, FIG. 8, oil is forced from the pump intake chamber 208 past check valve 230 into the pump outlet chamber 206.

Fluid under pressure is delivered from the pump outlet chamber 206 to chamber 122 through port 74, FIG. 3, flows into chamber 122 past the clutch screw and forces the apply or actuator piston 76 outward or to the right as viewed in FIG. 3 to compress the spring stack 78, thereby applying the friction pad 54 to the brake disc.

As piston 76 moves outward its movement is translated into rotary motion of the clutch screw 100.

When a predetermined pressure is attained, as sensed by the differential piston 410, FIG. 10, spring 418 is overcome, piston stem 384 extends to actuate crank 400. Pawl 327, FIG. 16, is thereupon released so that it no longer locks latch 324 in a position where it prevents an attempt to move the pump handle to home position.

The operator is then able to move the pump handle to stowed position. When the pump handle is moved to stowed position, plunger 310, FIG. 9, is actuated to depressurize the apply line 176. However, orifice 202 prevents a sudden release of pressure in the actuator cylinder, allowing spring 106 to seat (engage) the clutch lock before spring stack 78 relaxes to any appreciable extent. Nonetheless the spring stack 78 will eventually hold the clutch firmly engaged, preventing any rotation of screw 100 and the apply piston is thereby prevented from retracting.

The compressed spring stack 78 will compensate for temperature changes, holding the brake engaged. In the meantime pressure is entirely dissipated in the apply line.

B. Releasing the Brake

The selector valve is located in the position shown in FIG. 10. In this mode, the pump output will be directed by the selector valve to the release port 130, FIG. 3, through the release line check valve 158, FIG. 4, to the cylinder chamber 134 behind the brake release piston 110.

The brake release piston 110 is moved outwardly or to the right as viewed in FIG. 3, disengaging the clutch cone 101. Screw 100 is now free to rotate and will rotate due to spring stack 78 expanding and forcing the apply piston 76 to retract.

Fluid under pressure is applied by means of the pump handle in the same manner as in the apply mode.

The principal difference, compared to the apply mode, is that a check circuit, through switch 448, supplies a brake released signal only if the following operating conditions are complied with:

1. The selector valve is inward in the released position, FIG. 10, releasing the pump handle and positioning (indexing) the selector valve register slide 372;

2. Pumping action produces sufficient differential pressure on the left side of the differential piston 410 to overcome spring 418 to properly position or index the latch release slide 380 and at the same time to rotate the crank 400 and pawl 327 to release the pump handle latch; and 3. The pump handle latch will permit stowing of the pump handle which will move the pump handle register slide 370.

All three register slides are now in the proper position and switch 448 is activated to produce a brake released signal.

The selector valve in released position is shown by the indicator segment as OFF.

Modified Pumping Piston

The pumping piston 196, FIG. 8, is balanced in that substantially the same force (about eighty pounds) is required to move the piston inwardly as well as outwardly. The effective area of the piston on the side opposite the rod is about twice the rod diameter.

The operating force may be considerably reduced by constructing the hand pump piston in the manner shown in FIG. 17 to include two check valves 450 and 452 and a rod 454 of reduced diameter compared to the one shown in FIG. 8. In FIG. 17 the effective area of the piston on the side opposite the rod is about four times the rod diameter. Both check valves are located in the piston head 456.

Valve 452 is a mere check valve, held seated by a spring as shown. A fluted or grooved button 458 is interposed between the spring and ball check 452, allowing fluid flow therepast toward rod 454 and opens when the piston is stroked to the right (to contract front chamber 208) corresponding to the upstroke of the pump handle.

Valve 450 on the other hand is a relief valve, normally held closed by a spring as shown, in which the spring setting is such that it opens only when a force of say more than forty pounds is required on the downstroke of the pump handle, moving the piston to the left. Otherwise ball check valve 450 remains closed to pressurize fluid in rear chamber 206 when the piston is stroked to the left. Again, a grooved button 460 permits fluid flow therepast into chamber 208.

Thus, at the point where the force on the downstroke reaches approximately forty pounds the pump piston relief valve 450 will open and limit the necessary handle force for operation. After this point, the downstroke no longer has an effect on the output pressure and the pump is single-acting.

The valve means thus described are positioned in respective passages in the piston head 456, respectively ported to the front chamber 208 as shown. The piston head is provided with a rear recess 462. The aforesaid passages are also ported to recess 462 which communicates with a passageway 464 which in turn is ported to the rear chamber 206 in the manner shown.

I claim:

1. In a disc brake apparatus comprising a brake member movable from a released position forwardly to an engaged position where it engages the disc part which is to have the brake force applied thereto;

a plunger to be positioned opposite said brake member;
   a piston inside the plunger;
   a housing containing the plunger and piston;
   a normally expanded spring interposed between the plunger and piston and effective to transmit forward movement of the piston to the plunger thereby to engage the brake, said spring being compressed during further forward movement of the piston;
   said piston being threadedly supported by a screw and constrained against rotation, said screw having a clutch element thereon opposed to a clutch seat inside the housing such that when the clutch is disengaged the screw is free to rotate;
   a second spring tending to hold the clutch element on its seat, thereby engaging the clutch;
   said piston being in communication with a first chamber for fluid under pressure which when applied to the piston unseats the clutch element and advances the piston in the forward direction to both engage the brake and compress said spring;
   a fluid operated piston opposed to and engageable with the clutch element and disposed in a second chamber for unseating the clutch element to permit the first-named piston to retract, and a pressure relief check valve operable during the lapse between brake release and the next brake engagement to maintain sufficient pressure in said second chamber to actuate the second named piston to hold the clutch element unseated with a force which counters the return force of said second spring;
   and means to both fully release, while first slowly retarding the release of, fluid under pressure from said first chamber, after the first-named spring has been compressed, allowing said second spring, during retardation, to engage the clutch to hold the brake engaged before pressure is fully released from said first chamber, the last-named means consisting of a restricting orifice in the line which releases pressure from said first chamber.

2. Brake apparatus according to claim 1 in which the check valve is one of two check valves contained in a common housing, the other check valve allowing fluid under pressure to be admitted to the second chamber, and said check valves being mirror images of one another.

3. In a brake which is actuated by fluid under pressure applied to a reciprocal piston disposed in an actuator chamber, and in which the applied brake force on the piston is exerted through a spring which, upon brake engagement, is compressed and tends to restore the piston to a brake released position: a lock which when set prevents piston movement and which also holds the piston in its brake applied position with the spring compressed; a pressure release valve to release fluid under pressure from the actuator chamber after the brake is engaged, whereby the compressed spring tends to restore the piston; means operable to set the lock when fluid under pressure is no longer applied to the piston; a fluid operated piston disposed in a second chamber opposed to and engageable with the lock to release the lock to permit the first-named piston to retract, a pressure relief check valve to maintain sufficient pressure in said second chamber to maintain the lock released between cycles of operation; and means to momentarily retard the release of pressure from the actuator chamber, after the brake is fully released from the actuator chamber, the last-named means consisting of a restricting orifice between the actuator chamber and pressure release valve.

4. A brake according to claim 3 in which the check valve is one of two check valves contained in a common housing, the other check valve allowing fluid under pressure to be admitted to the second chamber, and said check valves being mirror images of one another.

* * * * *